Feb. 20, 1968   Z. D. BLACKISTONE, JR   3,369,321
GROUND LINE CEMETERY VASE

Filed Aug. 5, 1965                                         2 Sheets-Sheet 1

INVENTOR
ZACHARIAH D. BLACKISTONE Jr.
BY Shanley & O'Neil
ATTORNEY

Feb. 20, 1968  Z. D. BLACKISTONE, JR  3,369,321
GROUND LINE CEMETERY VASE
Filed Aug. 5, 1965  2 Sheets-Sheet 2

INVENTOR
ZACHARIAH D. BLACKISTONE JR
BY Shanley & O'Neil
ATTORNEY

United States Patent Office 3,369,321
Patented Feb. 20, 1968

3,369,321
GROUND LINE CEMETERY VASE
Zachariah D. Blackistone, Jr., 4316 Willow Lane,
Chevy Chase, Md. 20015
Filed Aug. 5, 1965, Ser. No. 477,374
7 Claims. (Cl. 47—41.1)

This invention relates generally to flower receptacle assemblies and, in one of its more specific aspects, is concerned with two-piece cemetery vase assemblies.

Cemetery vase flower holders should be able to provide flower support at selected elevations above ground level and be readily retractible to a ground level position over which power mowers and other equipment can be moved without damage to the flower holder structure or to the equipment.

Prior art cemetery vase structures have been limited by undue complexity which made them costly to manufacture and awkward to handle. Customarily, they have been cylindrical in configuration and of three-piece design including a ground insert receptacle, flower vase, and a longitudinally movable ring, a clasp, or other element fitted to the perimeter of the vase. When fitted together the ring, clasp, or other element is manipulated to determine the amount of movement of the vase within the receptacle and to provide support for the vase. Such three-piece structures have generally been manufactured from heavy gage metal, are difficult to manipulate, and are not readily retractable to ground level position.

The present invention departs from the conceptions of the prior art to provide a two-piece structure which is novel in principle and operation. This two-piece structure can be readily fabricated from plastic materials or metals, is easy to operate, economical to manufacture, and stable in either working or closed positions.

In describing the invention, reference will be had to the accompanying drawings wherein.

Figure 1:
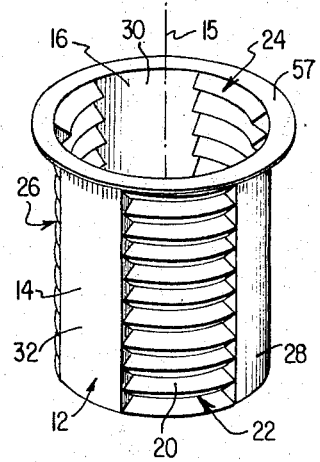
FIGURE 1 is a perspective view of housing structure embodying the invention.
Figure 2:
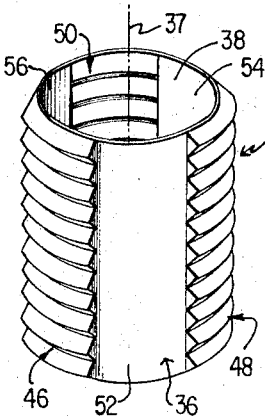
FIGURE 2 is a perspective view of vase structure, embodying the invention.
Figure 3:
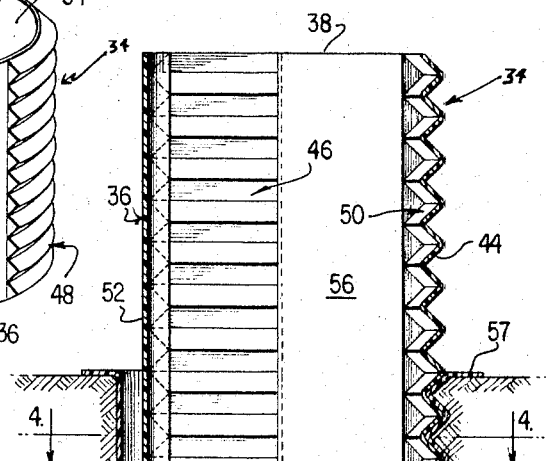
FIGURE 3 is a partial sectional view of the structures of FIGURES 1 and 2 in a working position.

Referring to FIGURES 1-6, ground insert housing 12 has a hollow tubular configuration with curvilinear sidewall 14 disposed in spaced relationship to longitudinal axis 15 of housing 12 and defining an open upper end 16. Endwall 18 at least partially closes the bottom end of the tubular housing 12. Sidewall 12 is formed with a series of V shaped serrations 20 extending inwardly toward the longitudinal axis 15 of housing 12. The serrations are grouped longitudinally in columns 22, 24, and 26. These columns are spaced around the periphery of the housing at approximately 120° or at other suitable intervals. Serration-free panels 28, 30 and 32 separate serration columns 22, 24 and 26.

Vase 34 has an elongated hollow tubular configuration. Sidewall 36, radially spaced from longitudinal axis 37, defines an open upper end 38 and endwall 40 closes the longitudinally opposite end of vase 34. A recessed handle 42 can be provided in endwall 40. V shaped serrations 44 are formed in the sidewall 36 and extend radially outward in a direction away from the longitudinal axis 37 of the vase 34. Serrations 44 are grouped in longitudinal columns 46, 48 and 50 which are spaced around the periphery of the vase 34 in alternating relationship with serration-free panels 52, 54 and 56.

Vase 34 is adapted to move telescopically within the ground insert housing 12 when longitudinal axes 11 and 37 are coextensive and serration columns 46, 48 and 50 on vase 34 are aligned longitudinally with the serration-free panels 28, 30 and 32 of housing 12.

The serrations on the housing 12 and vase 34 have substantially the same cross-sectional configuration and are substantially uniformly spaced longitudinally on housing sidewall 14 and vase sidewall 36.

Figure 4:
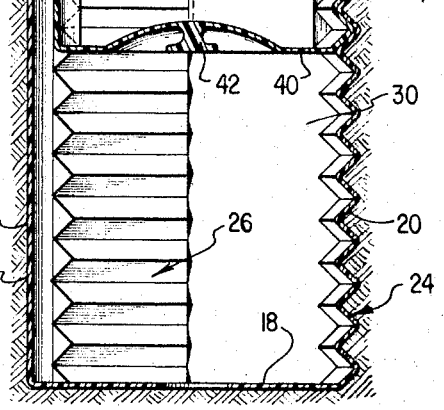
FIGURE 4 is a cross sectional view along the line 4—4 of FIGURE 3.
Figure 6:
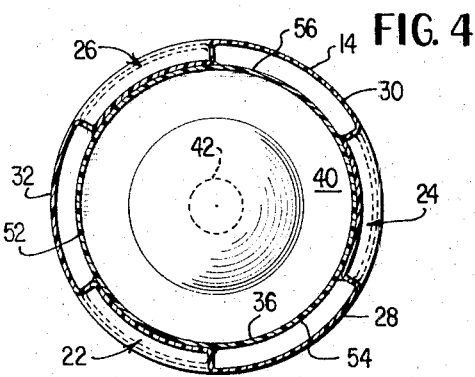
FIGURE 6 is a cross sectional view along the line 6—6 of FIGURE 5.
Figure 6:
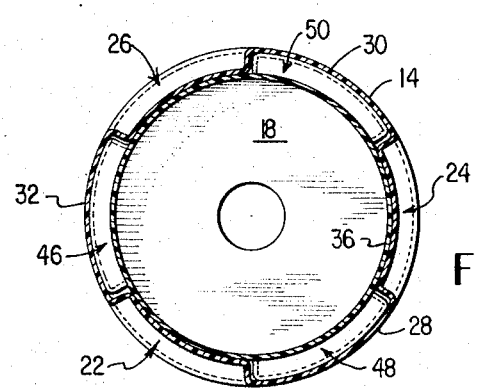

Referring in particular to FIGURE 4, when vase 34 is rotated about its longitudinal axis with relation to housing 12, the serrations on the sidewalls of housing 12 and vase 34 interlock and the vase can be positioned at any one of a plurality of levels as determined by the number of serrations along the sidewalls of these vessels.

Figure 5:
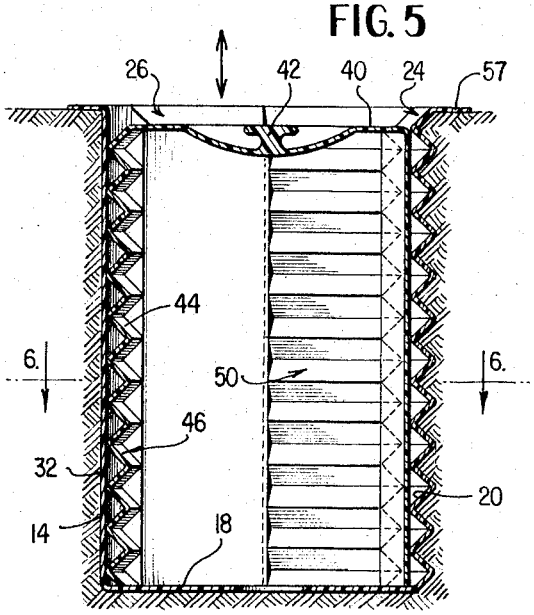
FIGURE 5 is a partial sectional view of the structures of FIGURES 1 and 2 in closed position.

Vase 34 can be removed from housing means 12, inverted, lowered its full length into the housing, and then rotated in order to secure the vase in closed position as shown in FIGURE 5. Because of the generally cylindrical configuration of vase 34, it can be reversibly inserted, that is open end first or open end last, easily into the housing 12.

When housing 12 is embedded in the ground its full length, a flange 57 should be included in order to hold the housing at ground level and help prevent silt from washing into the housing. The housing endwall 18 includes an aperture for drainage of water, or the bottom endwall may be partially closed with crossbars or other suitable means to lend strength and rigidity to that end of housing 12 and allow water drainage.

While flower receptacle assemblies of this general class have in the past been fabricated from heavy gage metal, the present invention lends itself to economic manufacture from fiberglass sheets, plastics, or metal strip. The sidewalls of both the housing and vase can be fabricated from continuous strip material in which the serrations are formed, in a continuous rolling operation, at suitably spaced intervals, along the length of the strip. The width of the strip can be slightly in excess of sidewall height, or multiples thereof, in order to allow for edge trimming, formation of a flange on the housing, an upper lip on the vase means, bottom endwall seam, and shrinkage dependent on the method of forming the serrations.

After formation of suitably spaced serrations, the strip is cut laterally to form lengths approximately equal to the peripheral measurements of the vase and housing, allowing excess as needed for an edge seam. The cut lengths are formed into tubular configurations and joined by any suitable method, folded or overlap seam with or without fusion or other bonding, to provide watertight closure along the longitudinal seam. Endwalls are attached to respective housing and vase sidewalls by any suitable seaming or bonding method. The over-all diametral dimensions of the vase means are slightly less than those of the housing means in order to facilitate insertion and interlocking of the vase means. Also lateral edges of the serrations adjacent to serration-free panels may be beveled in order to facilitate guiding the threads together when interlocking the vase and housing means.

While the serrations have been referred to as V shape in cross-section, it is understood that other cross-sectional shapes, whether rounded or polygonal, can be used.

In the above-described figures the serrations extend over the full longitudinal lengths of the housing and vase means. Such an arrangement provides a wide selection of elevations and facilitates interlocking of the vase and housing means. However, the teachings of the invention extend to a lesser number of serrations. Such embodiments can include several serrations in groups spaced longitudinally of the vessels or a single interlocking serration formed about midway of the longitudinal lengths of the vessels, with the housing serration providing support for the vase in working position and holding the vase within the housing when in closed position.

In practice the number of columns of serrations on the housing means can vary from three, as illustrated. Also the length of the serrations, especially on the vase means, can be shortened considerably when support is provided at three or more points.

In the embodiment of FIGURES 7 through 12, receptacle 58 is an elongated hollow tubular housing of polygonal cross-sectional configuration, specifically a hexagon. Sidewall 59 is spaced radially from longitudinal axis 60 and defines an open end 61. Bottom endwall 62 at least partially closes the longitudinally opposite end of receptacle 58.

Along the sides of the polygonal structure indentions such as 63, 64, and 66 are formed about the periphery of receptacle 58. Each of the sides of the polygonal structure, or a suitable number of them, such as three in the case of a hexagon, include such indentions at various levels between the open end 66 and endwall 62. At each level the indentions lie in a plane which is substantially perpendicular to the longitudinal axis 60 of the structure. The indentions terminate short of each corner leaving open corners such as 69. The indentions extend inwardly to decrease the interior cross-sectional dimension of the receptacle 58 to form a shelf-like structure with open corners.

Figure 7:
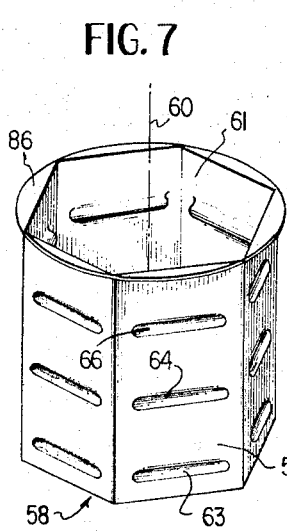
FIGURE 7 is a perspective view of housing structure embodying the invention.
Figure 8:
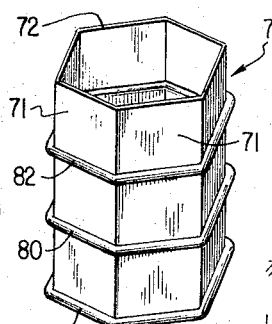
FIGURE 8 is a perspective view of vase structure embodying the invention.
Figure 9:
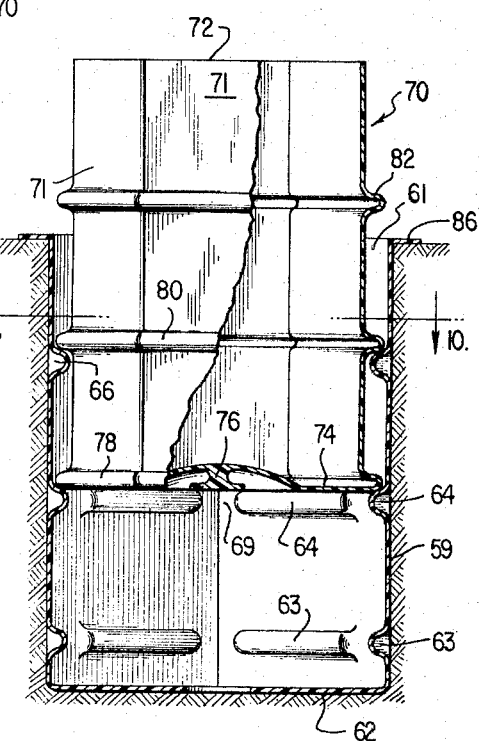
FIGURE 9 is a partial sectional view with the structures of FIGURES 7 and 8 in working position.
Figure 11:
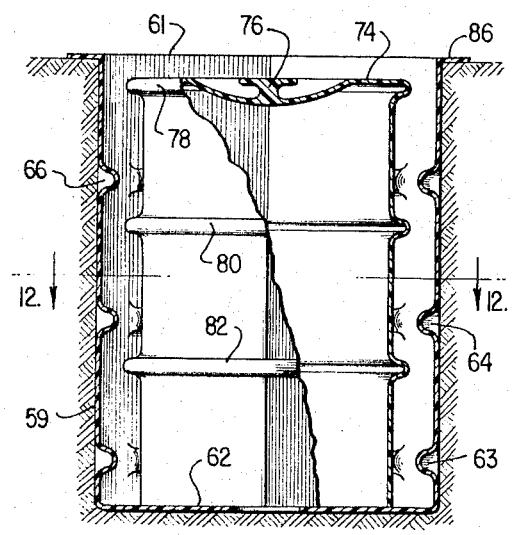
FIGURE 11 is a partial sectional view of the structures of FIGURES 7 and 8 in closed position.

Vase structure 70 is an elongated hollow tubular vessel of polygonal cross sectional configuration with an equal number of sides to the configuration of receptacle 58 of FIGURE 7. The vase sidewall 71 defines an open end 72. Endwall 74 with recessed knob 76 closes the opposite longitudinal end of vase 70.

Protrusions such as 78, 80, and 82 are formed at various heights along the longitudinal perimeter of the vase 70. The distance between these protrusions corresponds to the distance between the indention means on receptacle 58. Such protrusions are shown extending laterally around the entire perimeter of the vase but can be limited to a plurality of the corners of the vase within the teachings of the invention.

Figure 12:
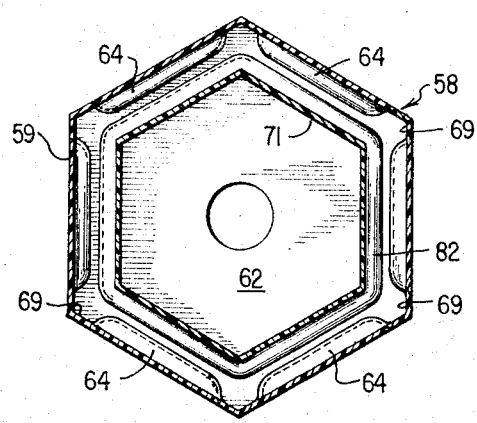
FIGURE 12 is a cross-sectional view along the line 12—12 of FIGURE 11.

As shown in FIGURE 12, the vase means fits telescopically within receptacle 58 when their sides are parallel. The vase means can then be moved inwardly and outwardly with respect to the receptacle 58 because of the open corner construction of the receptacle.

Figure 10:
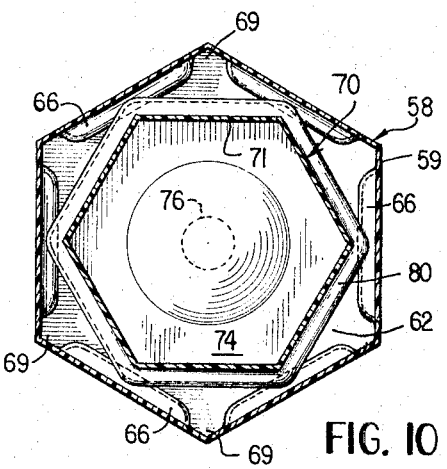
FIGURE 10 is a cross-sectional view along the line 10—10 of FIGURE 9.

As shown in FIGURE 10, vase 70 when rotated with respect to receptacle 58 brings the vase sidewall protrusions into contact with the receptacle sidewall indentions providing a stable support at a plurality of elevations. The assembly can be closed by removing and inverting vase 70, aligning the sides of the vase and receptacle 58 in parallel relationship, and lowering the vase its full length into the receptacle. Vase 70 can be locked in closed position by relative rotation of the vase with respect to receptacle 58.

A flange 86 can be formed at the open end 72 of receptacle 58 to stabilize the receptacle at ground level and help prevent silt from washing into the receptacle.

The polygonal configuration of FIGURES 7 through 12 can also be fabricated from continuous lengths of sheet material in a manner similar to the method described earlier in relation to FIGURES 1 through 4. That is, the indentions on the receptacle and protrusions on the vase can be formed in continuous strips of fiberglass materials, plastic materials, or metals. Corner configurations can also be preformed or scored while in the continuous strip material. The continuous strip is cut into suitable lengths, formed into tubular structures and endwalls added in a manner similar to the method described earlier.

While specific embodiments have been described in order to disclose the principles of the invention, it is understood that modifications in configuration and additions can be made without departing from the principle of the invention. Therefore, in defining the scope of the present invention, reference will be had to the appended claims.

What is claimed is:

1. A two-piece assembly for providing multi-level flower support and adapted to be secured in a closed position comprising in combination an elongated hollow tubular housing means having a longitudinal axis and sidewall means with a curvilinear peripheral configuration defining an open end and having endwall means longitudinally opposite to the open end, the endwall means at least partially closing that end of the housing means, the housing sidewall means including a plurality of serrations distributed peripherally about the housing sidewall means and lying in a common plane which is substantially perpendicular to the longitudinal axis of the housing means, with serration-free portions of the housing sidewall means lying in the same common plane separating the peripherally distributed serrations, and elongated hollow tubular vase means having a longitudinal axis and sidewall means defining a curvilinear peripheral configuration defining an open end and having vase endwall means longitudinally opposite to the open end, the vase endwall means closing that end of the vase means, the vase sidewall means including a plurality of serrations distributed peripherally about the vase sidewall means and lying in a common plane which is substantially perpendicular to the longitudinal axis of the vase means, with serration-free portions of the vase sidewall means lying in the same common plane and separating the peripherally distributed serrations of the vase means, the configurations and diametral dimensions of the vase means and housing means permitting the vase means to be reversibly inserted, open end first or open end last into the housing means and to be moved telescopically within the housing means when their longitudinal axes are substantially coextensive and the serrations on the vase means are aligned with the serration-free portions of the housing sidewall panels and to be held within the housing means by relative rotational movement of the vase means within the housing means.

2. The structure of claim 1 in which the vase sidewall means includes a plurality of columnar groupings of longitudinally aligned serrations with individual serrations in the groupings being distributed longitudinally in a plurality of planes substantially perpendicular to the longitudinally axis of the vase means between the open end and endwall means of the vase means, the columnar groupings of serrations being distributed peripherally about the peripheral configuration of the vase means and separated by longitudinally extending serration-free vase sidewall panels.

3. The structure of claim 1 in which the housing sidewall means includes a plurality of columnar groupings of longitudinally aligned serrations with individual serrations in the groupings being distributed longitudinally in a plurality of planes substantially perpendicular to the longitudinal axis of the housing means between the open end and endwall means of the housing means, the columnar groupings being distributed about the peripheral configuration of the housing means with individual columnar groupings separated by longitudinally extending serration-free housing sidewall panels.

4. The structure of claim 1 in which the elongated hollow tubular housing means is of generally cylindrical configuration and includes a flange means disposed about its open end in a plane substantially perpendicular to it longitudinal axis and extending radially outwardly from the housing sidewall means for providing ground level support for the housing means.

5. A two-piece assembly for providing multi-level flower support and adapted to be secured in closed position comprising in combination an elongated hollow tubular housing means with sidewall means spaced from and substantially parallel to its longitudinal axis in a polygonal cross-sectional configuration defining an open end, the housing means further including a housing endwall at least partially closing the end longitudinally opposite to the open end, the housing sidewall means including indentions extending toward its longitudinal axis lying in a plane substantially perpendicular to the housing longitudinal axis of the housing means located between longitudinal ends of the housing means, the indentions being interrupted at each corner of the polygonal configuration to form an interior shelf means with open interior corners, and an elongated hollow tubular vase means with sidewall means spaced from and substantially parallel to its longitudinal axis in a polygonal cross-sectional configuration defining an open end and a vase endwall closing a longitudinally opposite end of the vase means, the vase sidewall means including protrusions extending away from its longitudinal axis, the protrusions lying in a plane which is substantially perpendicular to the longitudinal axis of the vase means and is located between longitudinal ends of the vase means, the polygonal cross-sectional configuration of both the vase means and the housing means having an equal number of sides with the vase means having lateral dimensions permitting it to be reversibly inserted either open end first or open end last into the housing means and to be moved telescopically within the housing means when their respective sides are substantially parallel and their longitudinal axes substantially coextensive and to be held within the housing means when the vase means is rotated with respect to the housing means.

6. The structure of claim 5 including housing sidewall indentions in a plurality of planes substantially perpendicular to the housing longitudinal axis, the plurality of planes being distributed between longitudinal ends of the housing means with indentions in each plane being interrupted at each corner of the polygonal configuration to form a plurality of interior shelf means with open interior corners.

7. The structure of claim 5 including base sidewall protrusions arranged in a plurality of planes substantially perpendicular to the longitudinal axis of the base means with the plurality of planes being spaced longitudinally between the open end and endwall of the vase means.

References Cited

UNITED STATES PATENTS

| 1,784,621 | 12/1930 | Boyer | 47—41.1 |
| 1,907,775 | 5/1933 | Flook | 47—41.1 |

FOREIGN PATENTS

| 20,840 | 1892 | Great Britain. |

ROBERT E. BAGWILL, *Primary Examiner.*

R. CARTER, *Assistant Examiner.*